United States Patent [19]

Coash

[11] 4,128,205
[45] Dec. 5, 1978

[54] WIND CORRECTION METHOD AND APPARATUS FOR IRRIGATION SYSTEMS

[75] Inventor: Ronald J. Coash, Deshler, Nebr.

[73] Assignee: Reinke Manufacturing Company, Deshler, Nebr.

[21] Appl. No.: 785,595

[22] Filed: Apr. 7, 1977

[51] Int. Cl.² ............................................. B05B 17/04
[52] U.S. Cl. ........................................ 239/1; 239/177; 239/212
[58] Field of Search ............... 137/78, 80, 344; 239/1, 239/212, 213, 177

[56] References Cited

U.S. PATENT DOCUMENTS

| | | | |
|---|---|---|---|
| 2,878,098 | 3/1959 | Treloar et al. | 137/78 X |
| 2,988,287 | 6/1961 | Sherman | 239/177 X |
| 3,117,586 | 1/1964 | Cleaver | 137/78 |
| 3,352,493 | 11/1967 | Curtis | 239/212 X |
| 3,780,947 | 12/1973 | Ririe et al. | 239/212 X |

Primary Examiner—John J. Love
Attorney, Agent, or Firm—Lowe, Kokjer, Kircher, Wharton & Bowman

[57] ABSTRACT

A device which controls the discharge of liquid from an elevated spray head according to the wind conditions. A wind sensor is mounted near the end of an irrigation boom or other elevated pipe. An end spray head for the boom is controlled by a motor driven valve. When the sensor detects wind along the boom above a selected velocity, a circuit is activated to operate the valve motor in a manner to turn the spray head off or on, depending on the wind direction. The circuit includes time delay relays which disregard sudden gusts of wind.

10 Claims, 8 Drawing Figures

U.S. Patent          Dec. 5, 1978          4,128,205
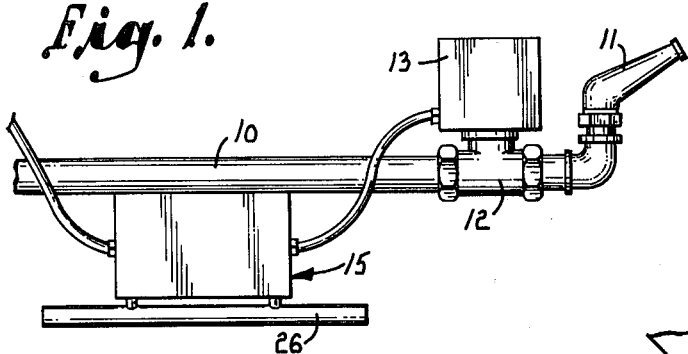
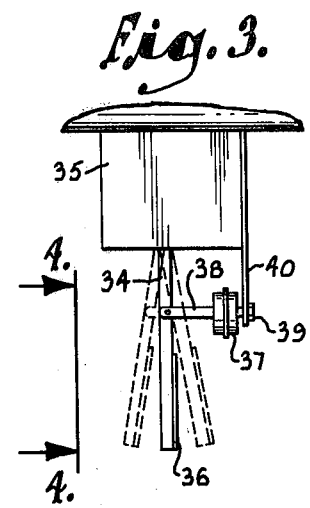
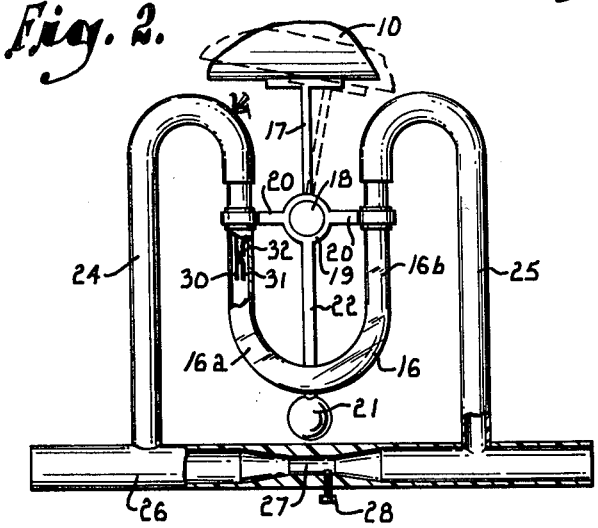
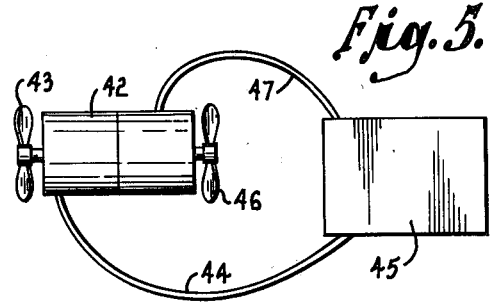
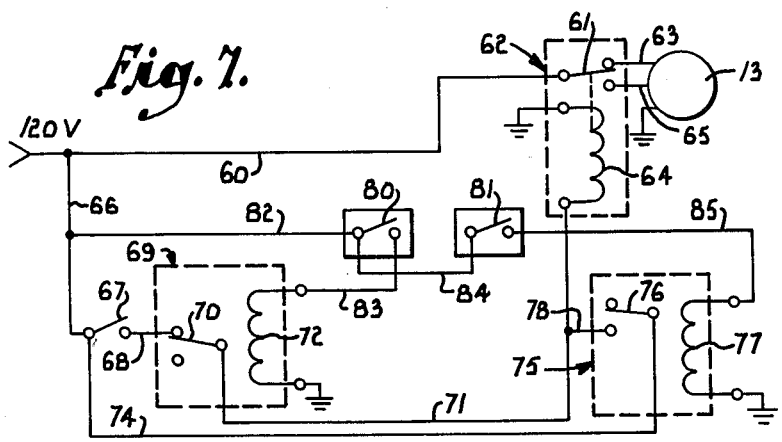
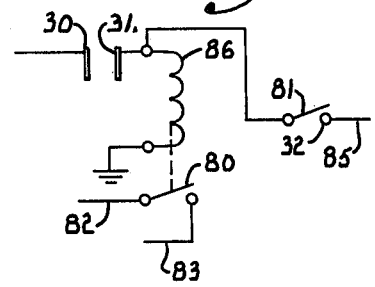

WIND CORRECTION METHOD AND APPARATUS FOR IRRIGATION SYSTEMS

BACKGROUND AND SUMMARY OF THE INVENTION

This invention relates to a wind correction device which is used with elevated pipes such as those used in field irrigation equipment to compensate for the effects of wind drift.

Irrigation systems typically include elevated booms from which water is applied to the field. In systems of this type and in similar equipment such as sprayers and the like, the wind has an adverse effect on the pattern in which the liquid is applied to the field. The wind tends to blow the liquid away from the intended area of application and onto other areas for which it is not intended.

As an example, center pivot irrigation systems usually have a spray head (known as an "end gun") on the end of the irrigation boom which is used to spray water onto the corners of a square field through which the boom is moved in a circular path. If the end gun is on with the wind blowing outwardly along the boom, the water is carried onto roadways and other areas beyond the field. Conversely, when the wind is blowing inwardly along the boom and the end gun is off, the areas near the outer end of the boom are not adequately irrigated and the crop yield suffers accordingly. The wind thus causes an uneven distribution of water in the field and the waste of substantial quantities of water which are blown out of the field. These and other undesirable effects of wind drift present a particularly serious problem in areas where high winds occur with considerable frequency.

It is an object of the present invention to provide a wind correction device and method for controlling the discharge of liquid from an elevated spray head in a manner to compensate for the effects of wind drift.

Another object of the invention is to provide a device of the character described that includes an accurate sensor for detecting the wind velocity and direction in order to control the discharge of liquid in accordance with the wind conditions.

Still another object of the invention is to provide a device of the character described which is readily adapted for attachment to irrigation systems of various types and to other liquid application equipment.

A further object of the invention is to provide a device of the character described in which the sensor is maintained in position to accurately detect the wind direction, regardless of the position of the irrigation boom on which it is supported.

An additional object of the invention is to provide a device of the character described which is able to accommodate sudden wind gusts without being adversely affected.

Yet another object of the invention is to provide a device of the character described which may be easily adjusted as to the wind level necessary to initiate its operation.

A still further object of the invention is to provide a device of the character described in which alternative wind sensors may be employed, each of which is simple and economical to construct and accurate and reliable in operation.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views:

FIG. 1 is an elevational view illustrating the wind correction device of the present invention mounted on the end portion of an elevated irrigation boom which is equipped with an end spray head and a motor driven valve for controlling the spray head;

FIG. 2 is an elevational view of a venturi-manometer wind sensor which may serve as the sensing mechanism of the wind correction device, with portions of the tubes shown in cross section;

FIG. 3 is a side elevational view of a paddle type wind sensor which is an alternative sensing mechanism for the wind correction device, with the broken lines indicating pivotal movement of the paddle assembly;

FIG. 4 is a fragmentary elevational view taken generally along line 4—4 of FIG. 3 in the direction of the arrows;

FIG. 5 is a diagrammatic view of a generator type wind sensor which is another alternative sensing mechanism for the wind correction device;

FIG. 6 is an elevational view of a venturi-diaphragm wind sensor which is still another alternative sensing mechanism for the wind correction device, with portions of the tube shown in cross section;

FIG. 7 is a schematic diagram of a circuit that may be used to connect the sensing mechanism with the valve control for the end spray head shown in FIG. 1; and, FIG. 8 is a fragmentary schematic of a modification for the circuit of FIG. 7.

Referring to the drawing in detail, FIG. 1 illustrates the outer end portion of an elongate irrigation boom 10 which is supported at an elevated position above the field that is being irrigated. Boom 10 may be part of a center pivot irrigation system such as that shown in the Reinke U.S. Pat. No. 4,608,826, or it may be a stationary irrigation boom or any other elevated pipe through which liquid is pumped for application to a field.

Center pivot irrigation systems typically include an end spray head 11 (also known as an "end gun") on the end of the boom which applies water to the corners of a square field through which the boom is pivoted. Additional spray heads (not shown) are disposed along the length of boom 10. A conventional valve 12 is connected between end gun 11 and the end of boom 10 to control the discharge of water from the end gun. The operation of valve 12 is controlled by a motor 13 which may be a conventional electric motor.

In accordance with the present invention, the operation of motor 13 is controlled by a wind sensing device 15 which is mounted to the underside of boom 10 near the end gun 11. The wind sensor 15 may be of any suitable type, including the venturi-manometer type shown in FIG. 2.

The manometer device of FIG. 2 includes a U-shaped glass tube 16. The manometer tube contains mercury which is ordinarily at the same level in each of the vertical legs 16a and 16b of the tube. Tube 16 is pivotally suspended from a bracket 17 which is secured to the underside of boom 10. Bracket 17 carries a horizontal pin 18 at its lower end. A sleeve 19 fits over pin 18 and is able to freely rotate about the axis thereof. A pair of mounting spokes 20 extend laterally from the opposite sides of sleeve 19, and the legs 16a and 16b of the manometer tube are mounted to the ends of the spokes. A weight 21 is carried on the lower end of a vertical arm 22 which extends downwardly from connection with sleeve 19. Weight 21 serves to retain arm 22 vertical and thus to maintain tube 16 with its legs 16 a and 16b also vertical, regardless of the incline of boom 10.

A pair of curved tubes 24 and 25 are fit over and connected with the top ends of the respective manometer tube legs 16a and 16b. Legs 24 and 25 curve downwardly, and their lower ends connect with a venturi tube 26 which is always maintained horizontal due to the pivotal mounting of tube 16 and the action of weight 21. Tubes 24 and 25 are preferably flexible enough to permit the glass tube 16 to move in limited fashion, although they provide a firm mounting for the venturi tube 26. The venturi has large area portions near its opposite ends and a restricted area throat 27 at its center. The tubes 24 and 25 connect with the venturi at the large area portions thereof. An adjustable screw 28 is threaded into the bottom of the venturi to extend into the throat 27. The threaded adjustment provided by screw 28 permits the size of throat 27 to be varied according to the screw position. The open ends of venturi 26 may be enlarged to provide a funnel effect which widens the angle at the inlet to the venturi.

Three electrodes 30, 31, and 32 provide a switch device which closes when the wind direction is generally inwardly along boom 10. The electrode wires extend through the top portion of tube 24, and the electrodes are located in leg 16a of the manometer tube. Electrodes 30 and 31 extend downwardly to substantially the same depth and are normally immersed in mercury (or other electrically conductive liquid) that is contained within tube 16. Electrode 32 terminates above the normal level of the mercury in leg 16a. However, when inwardly directed wind increases the pressure in the right portion of the venturi and in the tube 25 that connects therewith, the mercury in leg 16a is caused to rise sufficiently to immerse electrode 32. The switch is thereby closed since electrode 32 is then electrically connected with electrode 30. If the wind direction is outwardly along the boom, then the increase in pressure in leg 24 will depress the level of mercury below electrodes 30 and 31, thus breaking the circuit between them. The circuit in which the wind sensitive switches are included will be described in connection with FIG. 7.

The wind sensing device 15 may alternatively be a paddle type sensor of the type shown in FIGS. 3 and 4. A lever arm 34 is pivotally mounted at its top end within a switch housing 35 that is mounted to the underside of boom 10. The lower end of arm 34 carries a paddle 36, the flat opposite surfaces of which face inwardly and outwardly in the direction of the boom axis. The effects of sudden gusts of wind are dampened by a dash pot type shock absorber 37 which is carried on the end of an arm 38. The opposite end of arm 38 is pivoted to an intermediate portion of arm 34. The shock absorber assembly includes an adjustment screw 39 which is threaded into a plate 40 that is mounted to extend below the switch housing 35. Adjustment of screw 39 varies the dampening force of the shock absorber 37 and thereby provides an adjustment of the wind level that is necessary to pivot lever arm 34 a given distance.

The force of the wind on the opposite surfaces of paddle 36 pivots lever arm 34 approximately between the broken line position shown in FIG. 3. Respective switches (not shown in FIGS. 3 and 4) located within switch housing 35 close when arm 34 is pivoted in opposite directions. Funnels (not shown) may be included to direct wind from various angles against the surfaces of paddle 36.

FIG. 5 illustrates yet another type of wind sensor that may be employed with the invention. A conventional generator 42 has a propeller 43 mounted on one end in a manner to turn under the influence of wind blowing outwardly along boom 10. Turning of propeller 43 generates current which is applied to a line 44 that leads to a switch housing 45 mounted on the boom. A second propeller 46 rotates in response to inwardly blowing wind to generate current which is applied to a line 47 leading to the switch housing. A pair of switches (not shown in FIG. 5) within housing 45 open or close in response to voltages applied to the respective lines 44 and 47, as will be described in connection with FIG. 7.

Still another type of wind sensing device that may be used is shown in FIG. 6. A venturi tube 48 is supported from boom 10 and may be pivoted thereto such that the venturi is always maintained horizontal, as explained in connection with FIG. 2. Diaphragms 49 and 50 communicate with the large area portions near the opposite ends of venturi 48 by means of small diameter tubes 51 and 52, respectively. The tubes have elbows 51a and 52a located within the venturi which face toward outwardly blowing air and inwardly blowing air, respectively. The relatively small diameter of each elbow 51a and 51b reduces the effects of sudden wind gusts.

A small diameter conduit 53 connects with the restricted area venturi throat 54. A tee fitting 55 connects conduit 53 with suction line 56 and 57 which communicate with the respective diaphragms 49 and 50 on opposite sides thereof from tubes 51 and 52. Outwardly blowing wind pressurizes tube 51 and displaces diaphragm 49 in a manner to open a normally closed switch that is associated with the diaphragm and to be described in connection with FIG. 7. In a similar manner, inwardly blowing wind pressurizes tube 52 and causes displacement of diaphragm 50 in a manner to close a normally open switch also described in connection with FIG. 7.

FIG. 7 illustrates a circuit which controls the operation of valve operating motor 13 in accordance with the wind conditions. A power source (not shown) applies current to a line 60 which leads to a switch 61 forming part of a relay 62. Switch 61 normally connects with a line 63 that operates motor 13 in a manner to close valve 12. Relay 62 includes a solenoid 64 which controls the position of switch 61 and thus determines whether valve 12 is open or closed. Energization of coil 64 moves switch 61 to connection with a line 65 that operates motor 13 in a manner to open valve 12.

A line 66 connects with line 60 and leads to an on-off switch 67. Switch 67 is a switch which is operated responsive to the pivoting of the system to be closed when the boom is at the corners of the field, as disclosed in my aforementioned U.S. Pat. No. 3,608,826. Switch 67, when closed, connects line 66 with a line 68 that leads to a time delay relay 69. The relay 69 includes a switch 70 by which line 68 is normally connected with a line 71 that leads to the solenoid 64 of relay 62. Relay 69 includes a solenoid 72 that may be energized to open switch 70, thereby disconnecting lines 68 and 71. Relay 69 is an adjustable time delay relay of a well known type in which the solenoid 72 must be energized for a selected time interval before it will move switch 70.

Switch 67 and relay 69 are bypassed by a line 74 that connects with line 66. Line 74 leads to another time delay relay 75 that includes a normally open switch 76. Relay 75 includes a solenoid 77 which may be energized to connect switch 76 with a line 78 which leads to solenoid 64. Coil 77 must be energized for a selected time period before it will move switch 76.

The switches which are included in the wind sensing device 15 are designated in FIG. 7 by numerals 80 and 81. As indicated previously, switch 80 closes in response to wind blowing outwardly along boom 10 and switch 81 closes in response to inwardly blowing wind. Switch 80 is connected with a line 82 which is joined to line 66. Closing of switch 80 connects line 82 with a line 83 that leads to the coil 72 of relay 69. Switch 81 is connected with line 82 by a short line 84. When switch 81 closes, line 84 is connected with a line 85 that leads to the solenoid 77 or relay 75.

In operation, the wind sensing device 15 detects the presence of wind above a preselected velocity which blows inwardly or outwardly along boom 10. Although any of the alternative wind sensors may be employed, whichever is used (with the exception of the arrangement of FIG. 2) will result in the closing of switch 80 when the wind is blowing outwardly and the closing of switch 81 when the wind is blowing inwardly.

With switch 67 open, which occurs at times when the boom is between field corners, solenoid 64 is normally deenergized so that switch 61 normally connects with line 63 to close valve 12. However, if the wind is blowing inwardly, switch 81 closes to apply current to solenoid 77. This closes switch 76 and applies current to coil 64 via lines 74 and 78. Switch 61 is thus moved to connection with line 65 and valve 12 is opened. Water is then discharged outwardly from spray head 11 to adequately irrigate the area near the end of boom 10. The time delay provided by relay 75 compensates for the effects of short gusts of wind by failing to close switch 76 unless the wind that causes switch 81 to close is relatively steady for the period of time selected when the relay timer is set. If the wind drops below the level required to maintain switch 81 closed, switch 76 opens and coil 64 is deenergized so that switch 61 moves back to connection with line 63 for closing of valve 12.

When switch 67 is closed, line 71 normally applies current to solenoid 64 so that the switch 61 is connected with line 65 to open valve 12. However, switch 80 closes in response to outwardly blowing wind, and solenoid 72 is energized to open switch 70. Consequently, solenoid 64 is deenergized and switch 61 moves to connection with line 63 to close the valve. Thus water is conserved and roadways and other areas beyond the field do not receive wind blown water from the spray head 11. Again, the time delay provided by relay 69 compensates for sudden gusts of wind by failing to move switch 70 unless switch 80 remains closed for a selected time period. When the wind level drops, switch 80 opens so that switch 70 closes and current is applied to coil 64 for opening of valve 12.

If the FIG. 2 arrangement is used, switch 80 becomes a relay operated switch, as shown in FIG. 8. The contacts 30 and 31 are interposed in the line to the coil 86. When the system is operating normally, or in the presence of inward wind, the electrodes 30, 31 are immersed in the mercury and the circuit through coil 86 is closed, thus holding switch 80 open. The relay switch 80 is in the FIG. 8 arrangement biased toward the closed position; upon detecting outward wind of sufficient pressure to depress the mercury level below contacts 30 and 31, the circuit to the coil 86 is opened and switch 80 closes thereby to cut off water discharge through the end gun as previously described. Switch 81 is represented by the mercury. Obviously, inward wind of sufficient velocity will result in closing of the circuit through contacts 30, 31 and 32, with the results earlier described.

Although the invention has been described in connection with a center pivot irrigation system, it is to be understood that it is equally useful with other types of systems that apply liquid to a field from an elevated pipe in which wind drift is a factor. Also, the various wind sensors may be oriented to detect the presence of wind in any direction relative to the boom axis, and they may be used for outlets other than the end spray gun 11.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a mobile irrigation system having an elevated pipe for receiving liquid, an outlet in the pipe for discharging liquid therefrom in a direction generally axially outwardly of the pipe, and valve means which is normally open at times to deliver liquid to said outlet and normally closed at other times to substantially interrupt flow of liquid to said outlet, the combination therewith of:

a wind sensing mechanism operable to detect the presence of wind in excess of a predetermined velocity;

means mounting said sensing mechanism in an orientation to detect the presence of wind generally parallel to the pipe axis both inwardly and outwardly thereof; and means coupling said sensing mechanism with said valve means in a manner to close the latter in response to detection of wind in a direction generally outwardly of and parallel to said pipe during times when said valve means is normally open, and to open said valve means in response to detection of wind in a direction generally inwardly of and parallel to said pipe during times when said valve means is normally closed.

2. The combination of claim 1, wherein said sensing mechanism includes a tube oriented generally parallel to the pipe axis to receive air moving in a direction generally parallel thereto, and means for detecting pressure variations in said tube to sense the presence of wind both inwardly and outwardly along the pipe.

3. The combination of claim 2, wherein said sensing mechanism is supported from said pipe and said mounting means includes means for maintaining said tube in a horizontal orientation when the pipe axis is offset from horizontal.

4. The combination of claim 2, wherein said pressure detecting means comprises a manometer tube connected with said tube and containing an electrically conductive liquid which moves in said manometer tube in response to pressure variations in said tube.

5. The combination of claim 2, wherein said pressure detecting means comprises a diaphragm communicating with said tube, said diaphragm displacing in response to pressure variations in said tube.

6. The combination of claim 1, wherein said sensing mechanism includes a paddle member having respective opposite surfaces facing substantially inwardly and outwardly of the pipe, and means for detecting forces applied against said paddle surfaces.

7. The combination of claim 1, wherein said sensing mechanism includes:
- a pair of propellers supported to rotate under the influence of air moving respectively inwardly and outwardly of the pipe;
- a generator coupled with said propellers and operable to generate electricity in response to rotation thereof; and
- means for detecting the voltage generated by said generator.

8. The combination of claim 1, including control means for operating said valve means in response to the detection of wind inwardly and outwardly of the pipe in excess of said predetermined velocity, and means for delaying operation of said control means for a selected time period after the detection of wind by said sensing mechanism.

9. A method of controlling application of liquid to a field from a mobile pipe elevated above the ground and having an outlet which is normally open at times to discharge water from the pipe in a direction generally axially outwardly thereof, and which is normally closed at other times to interrupt the discharge of liquid from said outlet, said method comprising the steps of:
- sensing the velocity component of the wind blowing generally parallel to the pipe;
- closing said outlet in response to the presence of a velocity component of the wind above a preselected level and outwardly of the pipe during times when said outlet is normally open; and
- opening said outlet in response to the presence of a velocity component of the wind above a preselected level and inwardly of the pipe during times when said outlet is normally closed.

10. The method of claim 9, including the steps of:
- delaying said closing step until the velocity component outwardly of the pipe has remained above said preselected level for a predetermined time period; and
- delaying said opening step until the velocity component inwardly of the pipe has remained above said preselected level for a predetermined time period.

* * * * *